(12) United States Patent
Haga

(10) Patent No.: US 7,121,726 B2
(45) Date of Patent: Oct. 17, 2006

(54) FLUID BEARING DEVICE

(75) Inventor: Tomohiro Haga, Ozu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 51 days.

(21) Appl. No.: 10/972,402

(22) Filed: Oct. 26, 2004

(65) Prior Publication Data
US 2005/0111768 A1 May 26, 2005

(30) Foreign Application Priority Data
Nov. 21, 2003 (JP) .............................. 2003-391536

(51) Int. Cl.
F16C 17/02 (2006.01)

(52) U.S. Cl. ..................................................... 384/119
(58) Field of Classification Search ................ 384/114, 384/115, 119, 107, 124
See application file for complete search history.

(56) References Cited

U.S. PATENT DOCUMENTS
5,667,309 A 9/1997 Nose ........................... 384/132

FOREIGN PATENT DOCUMENTS
JP 2937833 6/1999

*Primary Examiner*—Lenard A. Footland
(74) *Attorney, Agent, or Firm*—Steptoe & Johnson LLP

(57) ABSTRACT

A fluid bearing device for preventing a lubricant from scattering outside even during rotation thereof, while holding a relatively large amount of lubricant in a seal surface portion. Lubricant is filled between a sleeve and a shaft, the seal surface portion is formed in a location facing an open end of the sleeve, a sectional shape of the seal surface portion is such that a smallest clearance from an outer peripheral surface of the shaft is at a radial bearing portion side end portion of the seal surface portion, a largest clearance is at an intermediate portion between the radial bearing portion side end portion and an open end side end portion of the seal surface portion, and a clearance at the open end side end portion of the seal surface portion is smaller than the clearance at the intermediate portion.

5 Claims, 5 Drawing Sheets

FLUID BEARING DEVICE

FIELD OF THE INVENTION

The present invention relates to a fluid bearing device suitable for a spindle motor of a hard disk device or the like. The fluid bearing device of the present invention is suitable as a fluid bearing device for motors of a video tape recorder and the like, in addition to a spindle motor of a hard disk device and so forth. Further, the fluid bearing device of the present invention can be used as a bearing for supporting other rotary parts.

BACKGROUND OF THE INVENTION

With an increase in capacity of a hard disk device of recent years, a number of fluid bearing devices, which are more excellent in rotational accuracy than a ball bearing and excellent in noiselessness, are being used as bearing devices for spindle motors of hard disk devices and the like, in place of ball bearing devices conventionally used.

In this type of conventional fluid bearing device, as schematically shown in FIG. 6 and FIG. 7, a hub 52 to which a magnetic disk is fixed is mounted to a sleeve 51 having an insertion hole in a center part, and a shaft 54 driven to rotate by a spindle motor part 53 is inserted into the sleeve 51 via a predetermined clearance. A lubricant 55 is filled in the clearance between the shaft 54 and the sleeve 51. A radial bearing portion 56 comprises a dynamic pressure generating groove in a herringbone shape or the like which is formed on at least one of surfaces opposing to each other of an outer peripheral surface of the shaft 54 and an inner peripheral surface of the sleeve 51, and the lubricant 55 is also filled in this radial bearing portion 56. When the shaft 54 is driven to rotate by the spindle motor part 53, pressure is applied to the lubricant 55 due to oil feeding action of the dynamic pressure generating groove of the radial bearing portion 56, so that the shaft 54 is rotatably supported with the sleeve 51 in the posture having a predetermined amount of clearance.

In a location of the outer peripheral portion in the shaft 54, which faces an open end 57, a seal surface portion 58 is formed by being notched toward the side of a shaft axis X to have a larger clearance than the part of the radial bearing portion 56, and the lubricant 55 is also stored in the clearance between the seal surface portion 58 and the sleeve 51 even during the bearing device is being rotated. Since a relatively large amount of lubricant 55 can be stored in the location provided with this seal surface portion 58, even when the amount of lubricant 55 reduces as a part of the lubricant 55 evaporates or the like, the lubricant 55 stored in the seal surface portion 58 flows into the radial bearing portion 56 by capillary action, and the radial bearing portion 56 is always kept in the state filled with the lubricant 55 so that bearing performance is kept favorable.

Hard disk devices including those using a spindle motor or the like having this kind of fluid bearing device have been desired to be reduced in size so that they can be accommodated in smaller spaces. This requires reduction in sizes of the spindle motor and therefore the fluid bearing device.

However, in the structure in which the seal surface portion 58 is formed by notching the outer peripheral portion of the shaft 54 toward the shaft axis X as shown in the above-described FIG. 7, the sectional area of the surface of the shaft 54 itself, which is orthogonal to the shaft axis X, is small, and therefore the holding capacity of the lubricant 55 in the seal surface portion 58 formed by notching the shaft 54 cannot be sufficiently large. As a result, when the diameter of the shaft 54 is small, such a phenomenon becomes more remarkable, and a sufficient amount of the lubricant 55 may not be held.

When the outer peripheral portion of the shaft 54 is largely notched in order to increase the lubricant-holding capacity in the seal surface portion 58, the substantial shaft diameter of the shaft 54 in this location becomes extremely small, thus causing the disadvantage of reducing the shaft strength for supporting the hub 52 and the like.

In order to overcome such problem, there exists the fluid bearing device in which a seal surface portion 61 is not formed at the shaft 54, but is formed at an inner peripheral portion facing the open end 57 in the sleeve 51 as shown in FIG. 8, and this kind of fluid bearing device is disclosed in, for example, Japanese Patent No. 2937833 and so on. In this case, the seal surface portion 61 has its sectional shape in which a clearance from the shaft 54 is made by only one inclined surface which widens toward the open end 57. According to this, the seal surface portion 61 is formed at the inner peripheral portion of the sleeve 51 which is larger in diameter than the outer peripheral portion of the shaft 54, and therefore as compared with the case in which the seal surface portion 61 is formed at the outer peripheral portion of the shaft 54, the seal surface portion 61 capable of storing a larger amount of lubricant 55 can be provided. Since the shaft 54 needs not be notched, the shaft 54 can keep its diameter so that the shaft strength for supporting the hub 52 or the like is not reduced.

However, when the structure of the conventional fluid bearing device as shown in FIG. 8 is adopted, a small inclination angle θ1 of the inclined surface forming the seal surface portion 61 with respect to the shaft axis X (in FIG. 8, the intersecting portion of the inclined surface forming the seal surface portion 61 and the shaft axis X is outside the drawing, and therefore depicted instead is the equivalent inclination angle θ1 with respect to the axial line which is parallel to the shaft axis X) requires a relatively large dimension L1 as the length in the axial direction of the seal surface portion 61, in order to hold a large amount of lubricant 55. And therefore, the dimension allowed for the radial bearing portion 56 becomes small correspondingly, thus reducing the bearing rigidity. Especially, when the length of the shaft 54 itself is small as a result of reduction in size, it is difficult to form the seal surface portion 61 which can hold a sufficient amount of lubricant.

On the other hand, if an inclination angle θ2 of the inclined surface forming the seal surface portion 61 with respect to the shaft axis X is made large, as shown in FIG. 9, a large amount of lubricant 55 can be held even if a dimension L2 in the axial direction that is allowed to form the seal surface portion 61 is small, but when the shaft 54 and the like of the fluid bearing device are driven to rotate, the lubricant 55 concomitantly generates a circling flow and easily scatters outside from the seal surface portion 61 by centrifugal force. If the lubricant 55 leaks outside, there may be a threat that the lubricant 55 in the radial bearing portion 56 becomes insufficient or the hub and the like become contaminated.

DISCLOSURE OF THE INVENTION

The present invention is to solve the above-described problems, and has its object to provide a fluid bearing device capable of preventing a lubricant from scattering outside even during the bearing device is being driven to rotate, while holding a relatively large amount of lubricant in a seal surface portion.

In order to solve the above-described object, the fluid bearing device of the present invention comprises a sleeve, a shaft inserted into the sleeve via a predetermined clearance, a radial bearing portion for allowing the sleeve to rotatably support the shaft, a lubricant filled in the clearance between the sleeve and the shaft, including a location of the radial bearing portion, and a seal surface portion formed in a close vicinity of an open end in an inner peripheral surface of the sleeve, and having a larger clearance from the shaft than at the radial bearing portion, the larger clearance being filled with the lubricant, wherein the seal surface portion has a sectional shape in which a clearance from an outer peripheral surface of the shaft in a radial bearing portion side end portion of the seal surface portion is the smallest, the clearance from the outer peripheral surface of the shaft at an intermediate portion between the radial bearing portion side end portion of the seal surface portion and an open end side end portion of the seal surface portion is the largest, and a clearance from the outer peripheral surface of the shaft at the open end side end portion of the seal surface portion is smaller than the clearance at the intermediate portion.

According to this, a large amount of lubricant can be held because the clearance between the seal surface portion and the outer peripheral surface of the shaft can be easily made large, and the length dimension of the radial bearing portion can be taken sufficiently because the depth of the seal surface portion from the open end can be made small. Further, since the clearance from the outer peripheral surface of the shaft at the open end side end portion of the seal surface portion is smaller than the clearance at the intermediate portion, the lubricant can be prevented from scattering outside even during the bearing device is being driven to rotate, thus keeping favorable reliability.

As the sectional shape of the seal surface portion with respect to the shaft axis, for example, a shape recessed in an approximately circular arc shape, or a shape recessed in an approximately triangular shape may be adopted.

DESCRIPTION OF THE EMBODIMENTS

Hereinafter, embodiments of the present invention will be explained based on the drawings.

In an embodiment of the present invention shown in FIG. 1 to FIG. 4, the case in which a fluid bearing device is used as a spindle motor of a hard disk device is described, but the present invention is not limited to this.

Figure 1:
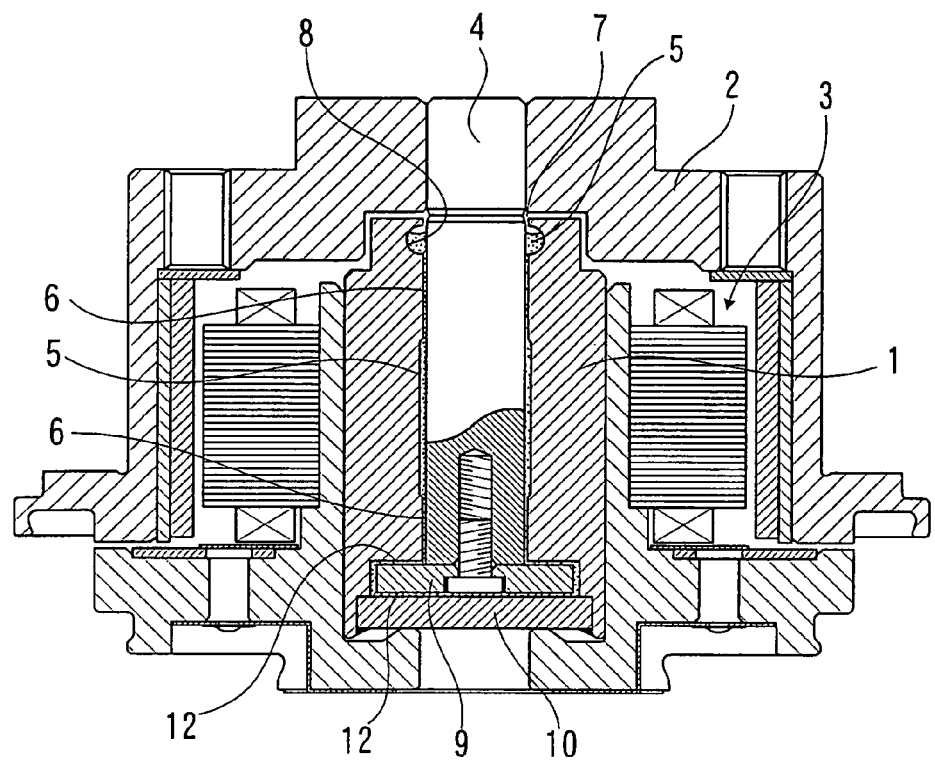
FIG. 1 is a cross-sectional front view of a fluid bearing device according to a first embodiment of the present invention.
Figure 2:
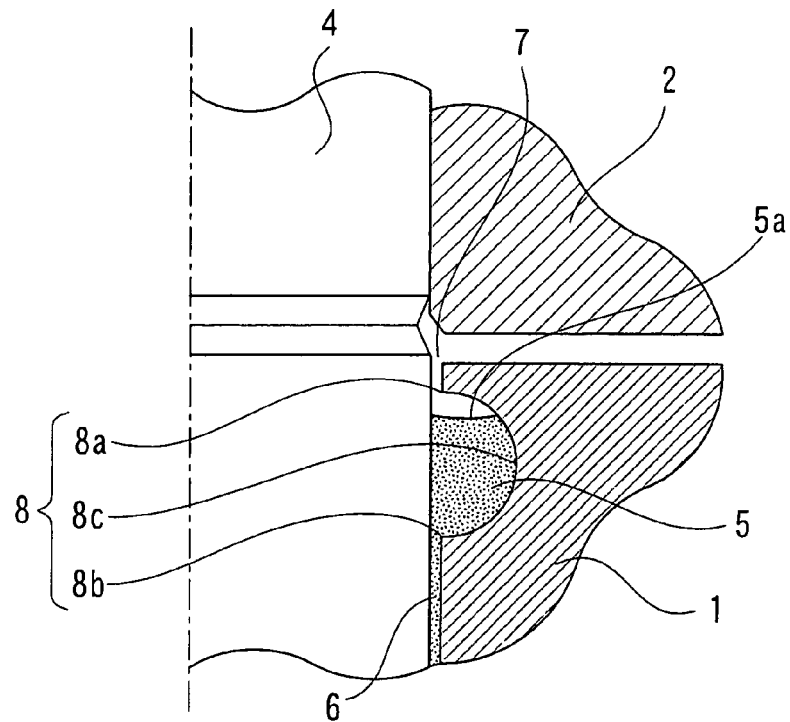
FIG. 2 is a partial cross-sectional front view of the fluid bearing device according to the first embodiment of the present invention.

As schematically shown in FIG. 1 and FIG. 2, in this fluid bearing device, a hub 2 to which a magnetic disk is fixed is mounted to a sleeve 1 having an insertion hole in a center portion, a shaft 4 driven to rotate by a spindle motor portion 3 is inserted into the sleeve 1 via a predetermined clearance, and a lubricant 5 is filled in the clearance between the shaft 4 and the sleeve 1. A dynamic pressure generating groove in a herringbone shape or the like is formed on at least one of an outer peripheral surface of the shaft 4 and an inner peripheral surface of the sleeve 1 in the surfaces opposing to each other to construct radial bearing portions 6, and the lubricant 5 is filled in the clearance including the locations of the radial bearing portions 6. In this embodiment, the radial bearing portions 6 are provided respectively in two locations that are an inner location and a location adjacent to an opening between the shaft 4 and the sleeve 1.

A thrust flange 9 with a larger diameter than the shaft 4 is mounted to an end portion of the shaft 4, a thrust plate 10 is fixed to the sleeve 1 so as to be placed to oppose to a circular plane portion of the thrust flange 9, and the lubricant 5 is also filled in a clearance between the thrust flange 9 and the thrust plate 10. A dynamic pressure generating groove is formed on at least one surface in the opposing surfaces of the thrust flange 9 and the thrust plate 10 to construct a thrust bearing portion 12, and a dynamic pressure generating groove is formed on at least one surface in the surface of the thrust flange 9 adjacent to the end portion of the shaft 4 and the surface of the sleeve 1 opposing to the surface of the thrust flange 9 to construct the thrust bearing portion 12.

When the shaft 4 is driven to rotate by the spindle motor part 3, pressure is applied to the lubricant 5 by oil feeding action of the dynamic pressure generating grooves of the radial bearing portion 6 and the thrust bearing portion 12, so that the shaft 4 is rotatably supported by the sleeve 1 in the posture having a predetermined amount of clearance.

In the close vicinity of an open end 7 in an inner periphery of the sleeve 1, a seal surface portion 8 is formed by being notched to a side of an outer periphery so as to have a larger clearance than the portion of the radial bearing portion 6, and the lubricant 5 is also stored in the clearance between the seal surface portion 8 and the outer peripheral surface of the shaft 4 even at the time of being driven to rotate.

Especially in the present invention, as shown in FIG. 2, a sectional shape of the seal surface portion 8 is formed into a shape recessed in an approximately semicircular shape. A clearance from the outer peripheral surface of the shaft in the location of an open end side end portion 8a of the seal surface portion 8 is formed to be the smallest as a clearance from the outer peripheral surface in a location of a radial bearing portion side end portion 8b of the seal surface portion 8. The clearance from the outer peripheral surface of the shaft is formed to be the largest in an intermediate portion 8c between the open end side end portion 8a and the radial bearing portion side end portion 8b of the seal surface portion 8. Reference numeral and character 5a in FIG. 2 denotes a liquid level of a lubricant 5, and the lubricant 5 in such an amount as to be in contact with a portion between the intermediate portion 8c and the open end side end portion 8a of the seal surface portion 8 is filled.

According to this constitution, the seal surface portion 8 is formed so that the sectional shape with respect to the shaft axis X has the largest clearance from the outer peripheral surface of the shaft in the intermediate portion 8c, and therefore the clearance between the seal surface portion 8 and the shaft 4 can be easily made large, thus making it possible to hold a large amount of lubricant 5. Accordingly, even when the amount of the lubricant 5 reduces as a result that a part of the lubricant 5 evaporates or the like, the lubricant 5 stored in the seal surface portion 8 flows into the radial bearing portion 6 by capillary action, and the radial bearing portion 6 is always kept in the state filled with the lubricant 5, thus keeping the bearing performance favorable. Since the depth of the seal surface portion 8 from the open end 7 can be made small while a large amount of lubricant 5 can be held, the length dimension of the radial bearing portion 6 can be taken sufficiently, and high rotation accuracy and sufficient rigidity can be obtained.

Since in the close vicinity of the open end side end portion 8a in the seal surface portion 8, the clearance from the outer peripheral surface of the shaft 4 is in the shape which is larger toward the radial bearing portion 6, the lubricant 5 in this location is to move to the side of the intermediate portion 8c to generate the force causing the portion in the vicinity of the liquid level 5a of the lubricant 5 to compress to the radial bearing portion 6, whereby the lubricant 5 can be prevented from scattering to the outside from the open end 7. In addition, since the clearance from the outer periphery surface of the shaft 4 is extremely small in the location of the open end side end portion 8a in the seal surface portion 8, whereby the lubricant 5 can be reliably prevented from scattering to the outside and favorable reliability can be kept.

The shape of the seal surface portion 8 may be elliptical, and does not have to be complete circle.

Figure 3:
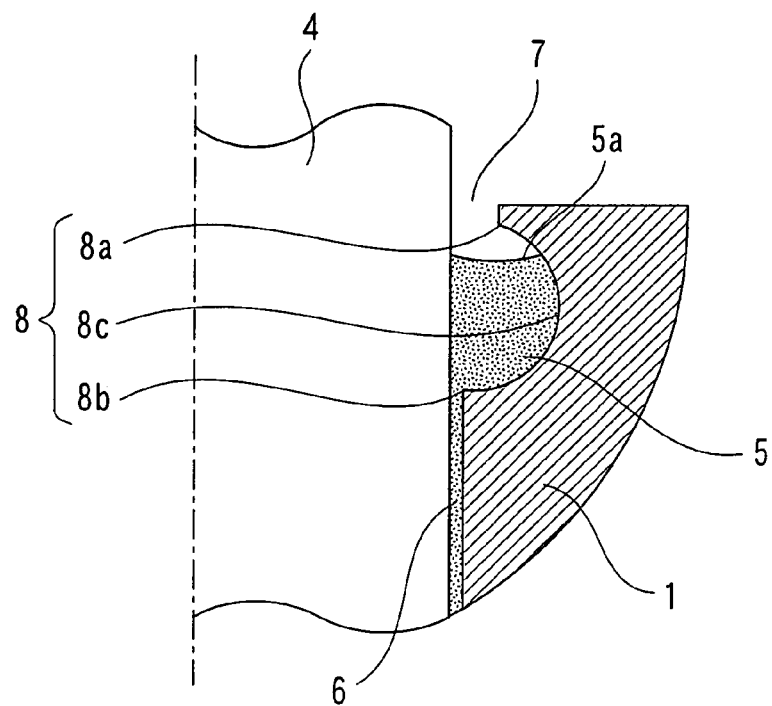
FIG. 3 is a partial cross-sectional front view of a fluid bearing device according to a second embodiment of the present invention.

Next, FIG. 3 shows another embodiment of the present invention, and in this embodiment, the sectional shape of the seal surface portion 8 is formed into a shape recessed in an approximately circler arc shape. The clearance from the outer peripheral surface of the shaft in the location of the open end side end portion 8a of the seal surface portion 8 is formed to be larger than the clearance from the outer peripheral surface of the shaft in the location of the radial bearing portion side end portion 8b of the seal surface portion 8, but is formed to be smaller than the clearance from the outer peripheral surface of the shaft in the location of the intermediate portion 8c of the seal surface portion 8. The lubricant 5 in such an amount that the liquid level 5a is in contact with a portion between the intermediate portion 8c and the open end side end portion 8a of the seal surface portion 8 is filled.

According to this constitution, the clearance between the seal surface portion 8 and the outer peripheral surface of the shaft 4 can be made large, and therefore a large amount of lubricant 5 can beheld. Even when the amount of the lubricant 5 reduces as a result that a part of the lubricant 5 evaporates or the like, the radial bearing portion 6 is always held in the state in which the lubricant 5 is filled, the bearing performance is kept favorable. Since the depth of the seal surface portion 8 from the open end 7 can be made small while a large amount of lubricant 5 can be held, the length dimension of the radial bearing portion 6 can be taken sufficiently, and high rotation accuracy and sufficient rigidity can be obtained. Since the clearance from the outer peripheral surface of the shaft 4 in the location of the open end side end portion 8a in the seal surface portion 8 is smaller than the clearance in the location of the intermediate portion 8c of the seal surface portion 8, the centrifugal force acting on the lubricant 5 is reduced to be small even at the time of being driven to rotate to be able to reliably prevent the lubricant 5 from scattering to the outside, and favorable reliability can be kept.

In this construction, the clearance from the outer peripheral surface of the shaft 4 is also in the shape which becomes larger toward the radial bearing portion 6 in the close vicinity of the open end side end portion 8a in the seal surface portion 8, and therefore at the time of being driven to rotate, the lubricant 5 in this location is to move toward the intermediate portion 8c to generate force which causes the portion in the vicinity of the liquid level 5a of the lubricant 5 to compress to the radial bearing portion 6, whereby the lubricant 5 can be prevented from scattering to the outside from the open end 7. In the location of the open end side end portion 8a in the seal surface portion 8, the clearance from the outer peripheral surface of the shaft 4 is larger than that in the embodiment shown in FIG. 2, but is smaller than the clearance in the location of the intermediate portion 8c, and thereby the effect of being able to prevent the lubricant 5 from scattering to the outside is also provided.

According to this construction, the clearance from the outer peripheral surface of the shaft 4 is larger than that in the embodiment shown in FIG. 2, and therefore when the lubricant 5 is injected into the clearance between the sleeve 1 and the shaft 4 from the side of the open end 7, a tip end of an injection jig is relatively easily inserted into the location provided with the seal surface portion 8, thus making it possible to facilitate the injecting operation. After the injecting operation of the lubricant 5, the amount and the filling state of the lubricant 5 are sometimes inspected by seeing the liquid level 5a of the lubricant 5, and the advantage of facilitating this inspection is also provided.

Figure 4:
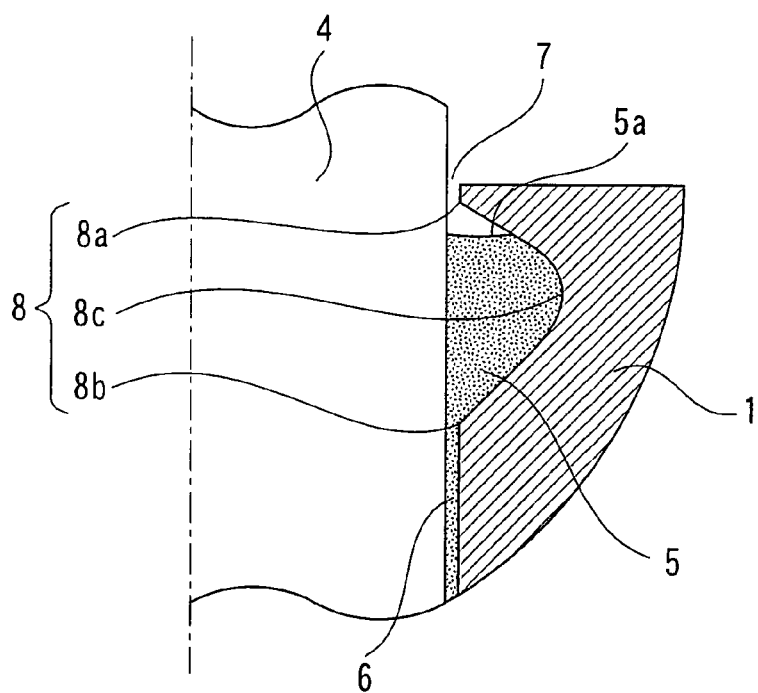
FIG. 4 is a partial cross-sectional front view of a fluid bearing device according to a third embodiment of the present invention.

FIG. 4 shows still another embodiment of the present invention, and in this embodiment, the sectional shape of the seal surface portion 8 is formed into a shape recessed in an approximately triangular shape. The clearance from the outer peripheral surface of the shaft in the location of the open end side end portion 8a of the seal surface portion 8 is formed to be the smallest as the clearance from the outer peripheral surface of the shaft in the location of the radial bearing portion side end portion 8b of the seal surface portion 8. The clearance from the outer peripheral surface of the shaft is formed to be the largest in the intermediate portion 8c between the open end side end portion 8a and the radial bearing portion side end portion 8b of the seal surface portion 8. Reference numeral and character 5a in FIG. 2 denotes a liquid level of the lubricant 5, and the lubricant 5 in such an amount as to be in contact with a portion between the intermediate portion 8c and the open end side end portion 8a of the seal surface portion 8 is filled.

According to this constitution, the same operation and effects as in the above-described embodiments can be obtained.

In any of the embodiments, the seal surface portion 8 is formed into the gentle shape over the entire periphery in the vicinity of the open end 7 in the inner peripheral portion of the sleeve 1, namely, without having small uneven portions and the like which are at only one part, thereby bringing about the advantage that when the lubricant 5 is introduced into the radial bearing portion 6 from the seal surface portion 8, the lubricant 5 can be allowed to flow into the radial bearing portion 6 smoothly without the flow of the lubricant 5 being inhibited by the uneven portions or the like.

Figure 5:
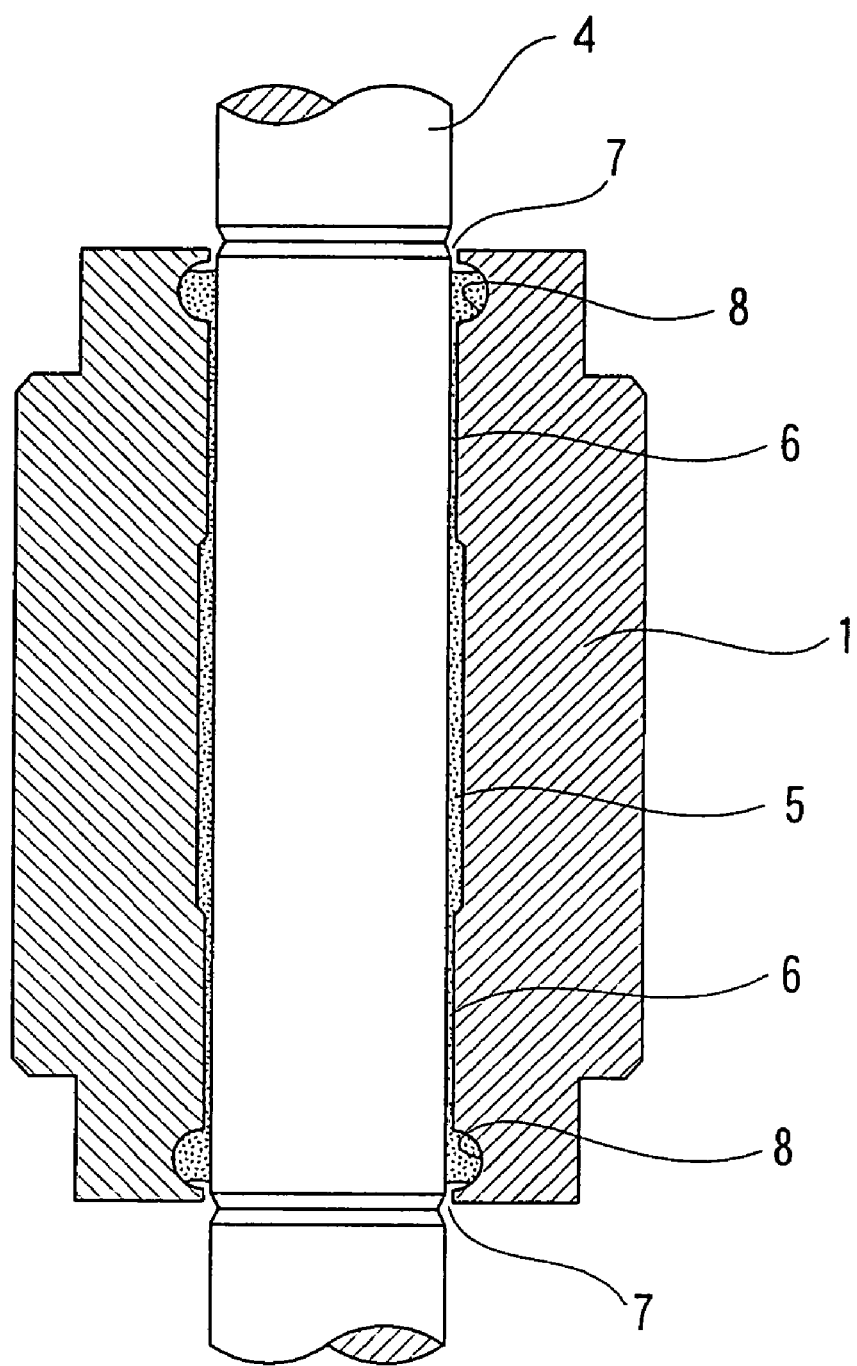
FIG. 5 is a partial cross-sectional front view of a fluid bearing device according to a fourth embodiment of the present invention.
Figure 6:
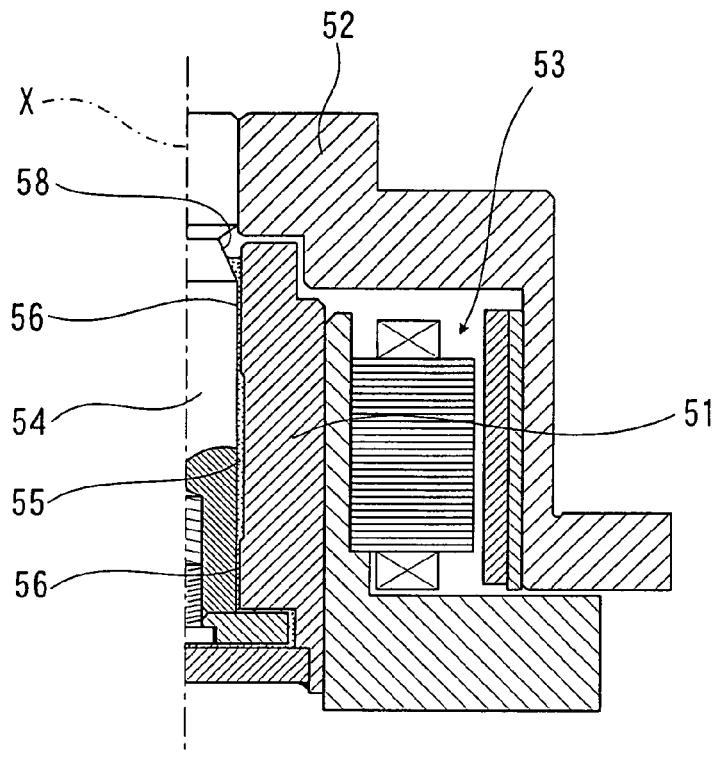
FIG. 6 is a cross-sectional front view of a conventional fluid bearing device.
Figure 7:
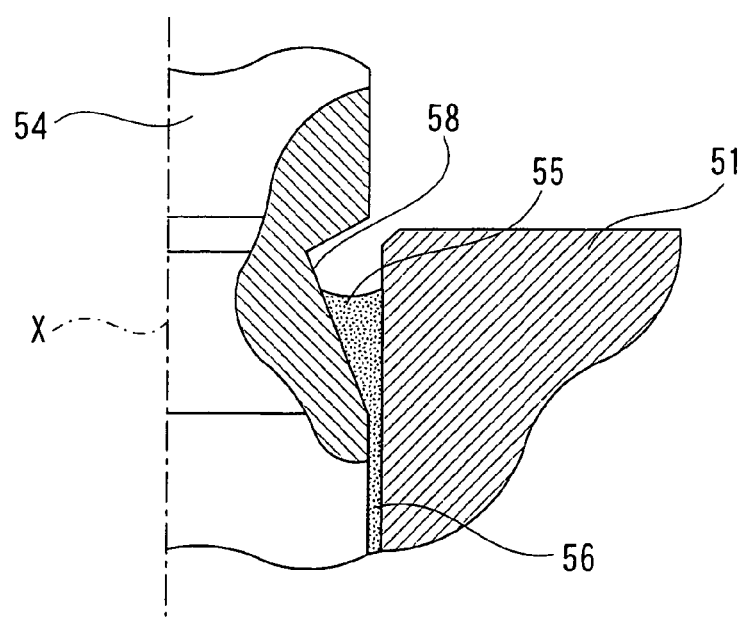
FIG. 7 is a partial cross-sectional front view of the same conventional fluid bearing device.
Figure 8:
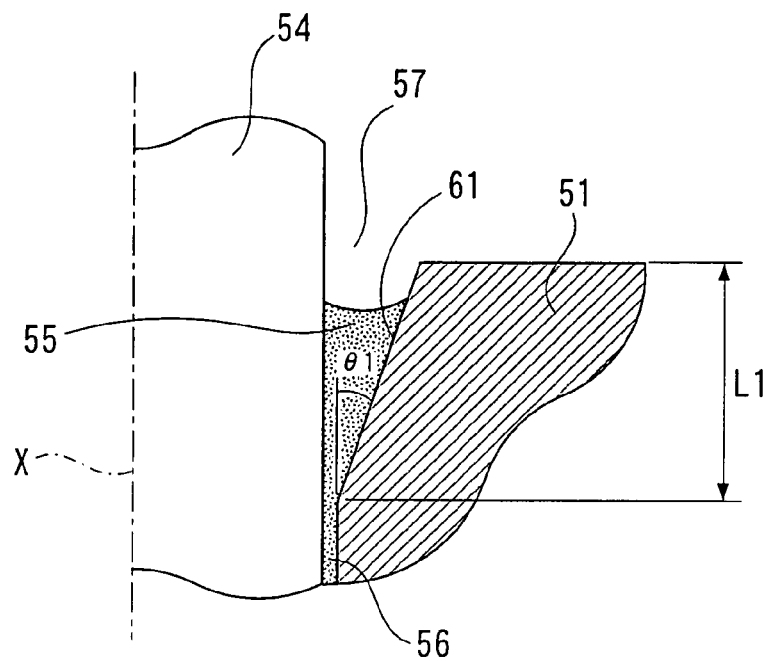
FIG. 8 is a partial cross-sectional front view of another conventional fluid bearing device.
Figure 9:
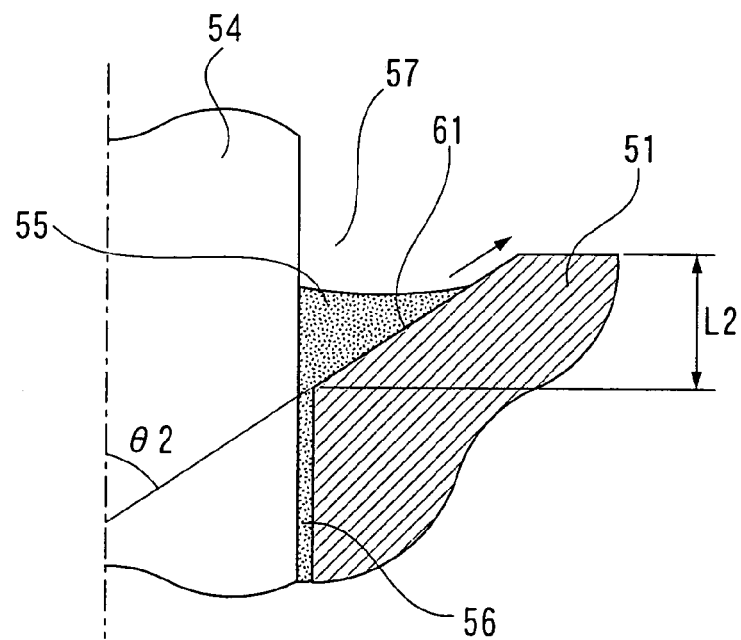
FIG. 9 is a partial cross-sectional front view of still another conventional fluid bearing device.

In the above-described embodiments, the case in which one side of the sleeve 1 is opened while the other side is closed, and only one end side of the shaft 4 is projected is described, and in this case, the seal surface portion 8 is provided at only one side of the sleeve 1. However, the present invention is not limited to this, and for example, as shown in FIG. 5 (in FIG. 5, the case having only a fluid bearing portion is shown), the present invention is applicable to the constitution in which both end portions of the shaft 4 are projected from both sides of the sleeve 1, and in this case, the seal surface portions 8 in the same shapes are formed respectively in the vicinity of the open ends 7 at both ends in the inner peripheral surface of the sleeve 1.

What is claimed is:

1. A fluid bearing device comprising:
   a bearing sleeve;
   a shaft rotatably mounted in the bearing sleeve, the bearing sleeve and the shaft defining a volume therebetween, an inner surface of the bearing sleeve comprising a surface of revolution having a profile in a plane including the axis of the bearing sleeve, which profile comprises, in order from one axial end of the bearing sleeve to the other;
   a first region of some axial length being a first constant radial length from said axis to said inner surface;
   a second region of some axial length being said first constant radial length from said axis to said inner surface; and
   a partially curved region of some axial length between and joining the first and second regions.

2. The fluid bearing device according to claim 1, wherein the curved region having an approximately circular arc shape.

3. The fluid bearing device according to claim 1, wherein the curved region has an approximately triangular shape.

4. The fluid bearing device according to claim 1, wherein the profile additionally comprises a third region of some axial length being a second constant radial length from said axis to said inner surface, the second constant radial length being larger than the first constant radial length, said third region being adjacent to said second region.

5. The fluid bearing device according to claim 4, wherein the profile additionally comprises a fourth region of some axial length being of said first constant radial length from said axis to said inner surface, the third region being between the second and fourth regions.

* * * * *